United States Patent
Scott et al.

(10) Patent No.: US 11,073,641 B2
(45) Date of Patent: Jul. 27, 2021

(54) METHODS OF FABRICATING RETROREFLECTOR PRISMS WITH POLYGONAL APERTURES AND DEVICES THEREOF

(71) Applicant: ORAFOL AMERICAS INC., Avon, CT (US)

(72) Inventors: Steven Scott, Avon, CT (US); Arthur J. Davis, Schaghticoke, NY (US)

(73) Assignee: ORAFOL AMERICAS INC., Avon, CT (US)

( * ) Notice: Subject to any disclaimer, the term of this patent is extended or adjusted under 35 U.S.C. 154(b) by 209 days.

(21) Appl. No.: 16/126,778

(22) Filed: Sep. 10, 2018

(65) Prior Publication Data

US 2019/0079223 A1    Mar. 14, 2019

Related U.S. Application Data

(60) Provisional application No. 62/556,735, filed on Sep. 11, 2017.

(51) Int. Cl.
    *G02B 5/124*      (2006.01)
    *B29D 11/00*      (2006.01)

(52) U.S. Cl.
    CPC ........ *G02B 5/124* (2013.01); *B29D 11/00605* (2013.01); *B29D 11/00625* (2013.01)

(58) Field of Classification Search
    CPC .... G02B 5/045; G02B 5/1847; G02B 5/1852; G02B 5/1861; G02B 5/124; B29D 11/00605; B29D 11/00625
    See application file for complete search history.

(56) References Cited

U.S. PATENT DOCUMENTS

| | | | |
|---|---|---|---|
| 2,380,447 A | 7/1945 | Jungerson | |
| 2,699,720 A * | 1/1955 | Howey | B41C 1/04 358/3.3 |

(Continued)

FOREIGN PATENT DOCUMENTS

| | | |
|---|---|---|
| CN | 107000343 A | 8/2017 |
| WO | 2013151691 A1 | 10/2013 |

OTHER PUBLICATIONS

International Search Report and Written Opinion for corresponding PCT Application No. PCT/US18/50264, dated Nov. 7, 2018.

(Continued)

*Primary Examiner* — Jason L Vaughan
(74) *Attorney, Agent, or Firm* — Troutman Pepper Hamilton Sanders LLP

(57) ABSTRACT

A method for forming a retroreflective prism in a substrate includes inserting and retracting a single point diamond tool through a surface of the substrate while moving the single point diamond tool, the substrate, or both the single point diamond tool and the substrate in a direction of travel along at least one axis to generate a facet in the substrate having a facet face parallel to the direction of travel of at least one of the single diamond point tool or the substrate. The facet face has an angle defined by a chiseling edge of the single point diamond tool. The inserting and retracting is repeated at a plurality of locations on the substrate to form an array of retroreflective microstructures on the surface of the substrate. At least one of the array of retroreflective microstructures is a retroreflective prism having a polygonal projected aperture.

20 Claims, 10 Drawing Sheets

(56) References Cited

U.S. PATENT DOCUMENTS

| | | |
|---|---|---|
| 3,689,346 A | 9/1972 | Rowland |
| 3,712,706 A | 1/1973 | Stamm |
| 4,478,769 A | 10/1984 | Pricone et al. |
| 4,588,258 A | 5/1986 | Hoopman |
| 4,775,219 A | 10/1988 | Appeldorn et al. |
| 5,171,624 A | 12/1992 | Walter |
| 5,780,140 A | 7/1998 | Nilsen |
| 6,015,214 A | 1/2000 | Heenan et al. |
| 6,253,442 B1 | 7/2001 | Benson et al. |
| 6,322,652 B1 | 11/2001 | Paulson et al. |
| 6,386,855 B1 | 5/2002 | Luttrell et al. |
| 7,156,527 B2 | 1/2007 | Smith |
| 7,261,426 B2 | 8/2007 | Smith |
| 8,510,951 B2* | 8/2013 | Lee ............ G02B 3/0018 29/895.32 |
| 8,887,396 B2* | 11/2014 | Wu ................ B31F 1/07 29/895.31 |
| 2014/0027293 A1 | 1/2014 | Lu |
| 2015/0048067 A1 | 2/2015 | Markowicz |

OTHER PUBLICATIONS

E. Brinksmeier et al., "Diamond Micro Chiseling of Large-Scale Retroreflective Arrays", Precision Engineering 36, pp. 650-657 (2012).

E. Brinksmeier et al., "Manufacturing of Molds for Replication of Micro Cube Corner Retroreflectors", Prod. Eng. Res. Devel. 2:33-38 (2008).

E. Brinksmeier et al., "Generation of Discontinuous Microstructures by Diamond Micro Chiseling", CIRP Annals—Manufacturing Technology, pp. 1-4 (2014).

C. Flucke et al., "Diamond Micro Chiseling of Molding Inserts for Optical Micro Structures", www.aspe.net/publications/Annual_2008/Papers/5Machn/2688.

Office Action for corresponding China Application No. 201880058800.5, dated Jun. 3, 2021.

* cited by examiner

METHODS OF FABRICATING RETROREFLECTOR PRISMS WITH POLYGONAL APERTURES AND DEVICES THEREOF

This application claims the benefit of U.S. Provisional Patent Application Ser. No. 62/556,735, filed Sep. 11, 2017, which is hereby incorporated by reference in its entirety.

FIELD

This technology relates to methods of fabricating retroreflector prisms with polygonal apertures and devices thereof. More specifically, this technology relates to using microchiseling techniques to fabricate retroreflective prisms with polygonal shaped apertures.

BACKGROUND

Microprismatic retroreflective sheeting has been made with truncated cubes and rectangular full cubes (see, e.g., U.S. Pat. Nos. 6,253,442; 7,156,527; and 3,689,346). The truncated designs are typically less efficient than rectangular full cubes and thus have difficulty meeting some of the newer ASTM and other global specifications for retroreflective sheeting.

Tool fabrication for retroreflective designs has been dominated by single point diamond ruling or flycutting for both truncated and rectangular prisms. In the flycutting process, the angle of the single point diamond tool is set on a spinning tool holder, such as a spindle. The single point diamond is then moved in a linear pattern through a substrate while the spindle rotates to make the required prism geometry (see, e.g., U.S. Pat. No. 3,712,706). Using this method, cuts are made in the substrate from one side of the substrate to the other at a spacing based on the desired final geometry of the retroreflector. The three prism facets are formed by rotating the substrate after one full orientation of grooves is completed. Using flycutting, variations in the prism geometry are limited by the constraints of the flycutting setup. Conventional flycutting techniques are not suited for fabrication of the retroreflective prisms disclosed herein.

SUMMARY

A method for forming a retroreflective prism in a substrate includes inserting and retracting a single point diamond tool through a surface of the substrate while moving the single point diamond tool, the substrate, or both the single point diamond tool and the substrate in a direction of travel along at least one axis to generate a facet in the substrate having a facet face parallel to the direction of travel of at least one of the single diamond point tool or the substrate. The facet face has an angle defined by a chiseling edge of the single point diamond tool. The inserting and retracting is repeated at a plurality of locations on the substrate to form an array of retroreflective microstructures on the surface of the substrate. At least one of the array of retroreflective microstructures is a retroreflective prism having a polygonal projected aperture.

A method for forming a retroreflective prism in a substrate includes providing a substrate having a surface. An array of retroreflective microstructures are microchiseled into the surface of the substrate. At least one of the retroreflective microstructures in the array of retroreflective microstructures is a retroreflective prism having a polygonal projected aperture.

A non-transitory computer readable medium having stored thereon instructions for forming a retroreflective prism in a substrate comprising executable code which when executed by a processor, causes the processor to perform steps comprising instructing a single point diamond tool to be inserted and retracted through a surface of the substrate while moving the single point diamond tool, the substrate, or both the single point diamond tool and the substrate in a direction of travel along at least one axis to generate a facet in the substrate having a facet face parallel to the direction of travel of at least one of the single diamond point tool or the substrate. The facet face has an angle defined by a chiseling edge of the single point diamond tool. The single point diamond tool is instructed to repeat the inserting and retracting at a plurality of locations on the substrate to form an array of retroreflective microstructures on the surface of the substrate. At least one of the retroreflective microstructures in the array of retroreflective microstructures is a retroreflective prism having a polygonal projected aperture.

The present technology advantageously provides enhanced methods for forming retroreflective prisms that may be utilized in fabricating retroreflective sheeting and tooling having polygonal retroreflective prisms. This technology utilizes microchiseling techniques to generate the polygonal retroreflectors, which provide an increased active area. The microchiseling process allows for generating an array that includes different types and geometries of retroreflective microstructures, including polygonal shapes such as triangular, rhombic, rectangular, square, pentagonal, hexagonal, or octagonal prisms, by way of example only.

DETAILED DESCRIPTION

Figure 1:
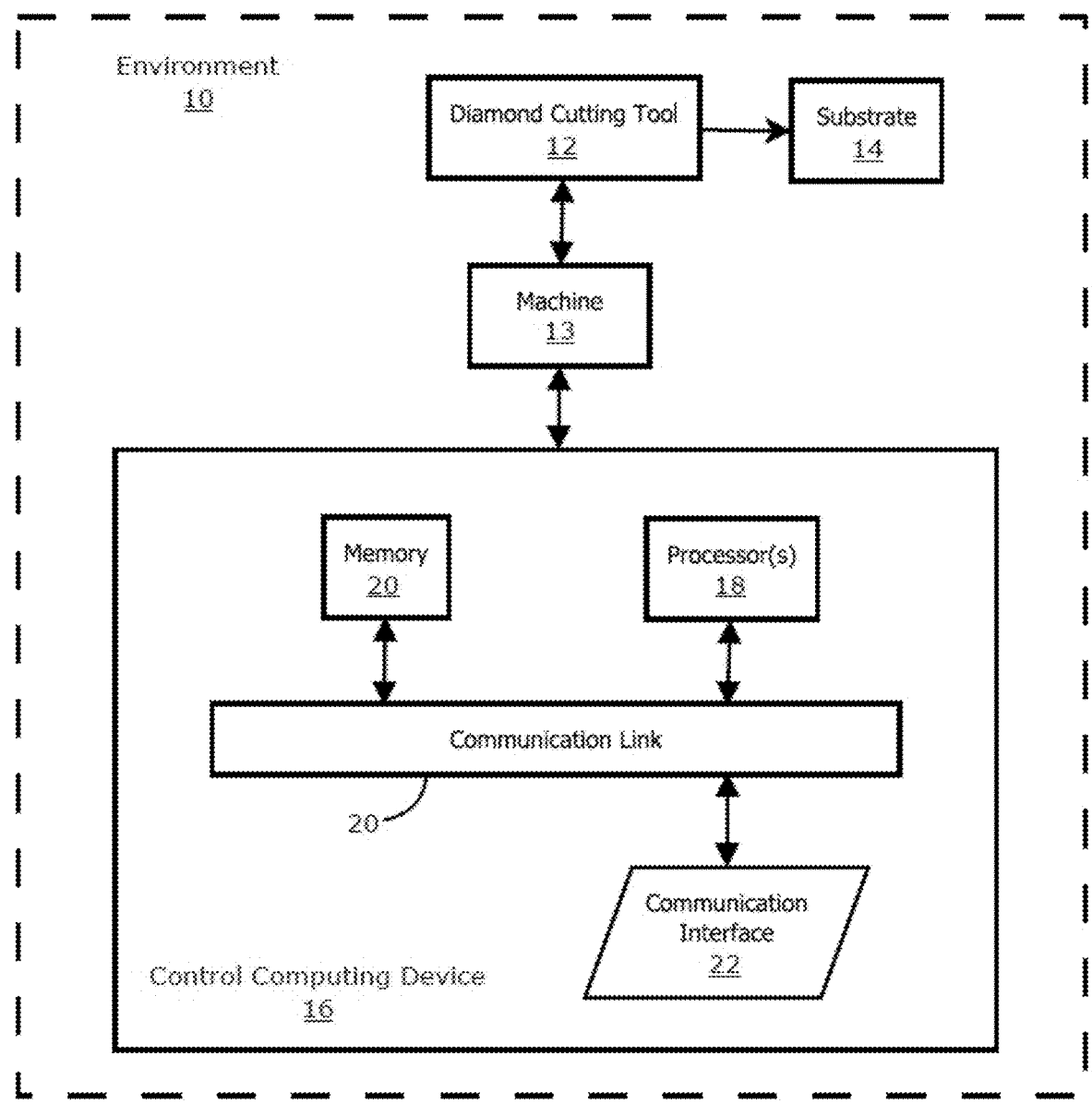
FIG. 1 is a block diagram of an environment for forming retroreflective prisms in a substrate.

Referring to FIG. 1, an environment 10 for forming retroreflective prisms in a substrate, that may be used for fabricating retroreflector tooling and retroreflective sheeting, using diamond microchiseling is illustrated. Diamond Micro Chiseling (DMC) is a process where a multi-axis high precision machine plunges and retracts a diamond through a substrate to remove material as described in Brinksmeier et al, "Diamond Micro Chiseling of Large-Scale Retroreflective Arrays", Precision Engineering, 34(4):650-57, (2012), the disclosure of which is hereby incorporated herein by reference in its entirety. DMC advantageously provides a method for generating retroreflector tooling including polygonal or other similarly shaped retroreflective prisms that cannot be produced using traditional flycutting techniques. DMC also provides increased flexibility in the retroreflector design. DMC allows for the production of polygonal retroreflectors with an increased active area that meet the various global specifications for such retroreflectors.

Referring again to FIG. 1, the environment 10 includes a diamond cutting tool 12 affixed to a translation machine 13, such as a five-axis translation machine, coupled to a control computing device 16, although the environment 10 may include other types and/or numbers of devices in other combinations. The diamond cutting tool 12 may be utilized to microchisel a substrate 14. In one example, the translation machine 13 is coupled to the control computing device 16 such that the control computing device 16 may be utilized to control the position of the diamond cutting tool 12. In another example, the substrate 14 may combined to a translation machine such that the substrate 14 may be moved, either alone, on in conjunction with movement of the diamond cutting tool 12, to perform the methods described herein. The translation machine 13 is configured to plunge and retract the diamond of the diamond cutting tool 12 through the substrate 14 using a feed rate of the translation machine 13 directing the diamond toward, through, and away from the substrate 14. The translation machine 13 further allows for additional axes of motion during the plunge and retraction generated by feed rate. In one example, the translation machine 13 engages multiple axes to provide a more complex tool path.

In one example, the diamond cutting tool 12 is designed specifically for the microchiseling process to be able to machine specific prism geometries. This allows the diamond cutting tool 12 to be more robust against the high cutting forces of the microchiseling process. In one example, the diamond of the diamond cutting tool 12 is designed to eliminate interference with other prisms previously formed in the substrate 14 or to include opposing draft angle features as part of the microchiseling process. In another example, the diamond design of the diamond cutting tool 12 can be asymmetric. By way of example, flats or radii can be added to the tip of the diamond of the diamond cutting tool 12 to minimize tool wear and increase longevity of the diamond cutting tool 12 with little to no performance decrease in the final retroreflective product.

The substrate 14 is formed of metals that are compatible with single point diamond machining. These include, by way of example only, brass, aluminum, copper, and high phosphorous nickel, although other metals or other materials may be used for the substrate 14. Manufacturing variables such as replication deviations, polymer shrinkage, and other dimensional and shape changes are factored into the geometry of the retroreflective master prism design. The performance of the end product must be compensated for in the prism design when machining into the substrate 14 as the final part is a polymer optic formed by UV/EB casting or embossing. In one example, for rapid prototyping and testing of new retroreflective designs, the optic can be microchiseled into a polymer substrate to allow testing of the design without replication.

In this example, the substrate 14 is a plano substrate. In another example, a non-plano substrate may be used for the workpiece. For example, microchiseling can be done on a workpiece with a spherical radius of curvature or freeform surface where the optical structures generated by the microchiseling are added to the non-flat substrate.

The control computing device 16 in this example includes one or more processors 18, a memory 20, and a communication interface 22, which are coupled together by a bus 24 or other communication link, although the control computing device 16 can include other types and/or numbers of elements in other configurations. The processor(s) 18 of the control computing device 16 may execute programmed instructions stored in the memory 20 for the any number of the functions described and illustrated herein. The processor(s) 18 of the control computing device 16 may include one or more CPUs or general purpose processors with one or more processing cores, for example, although other types of processor(s) can also be used.

The memory 20 of the control computing device 16 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 18, can be used for the memory 20.

Accordingly, the memory 20 of the control computing device 16 can store one or more applications or programs that can include computer executable instructions that, when executed by the control computing device 16, cause the control computing device 16 to perform actions described and illustrated below. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s) may be running in one or more virtual machines (VMs) executing on the control computing device 16.

The communication interface 22 of the control computing device 16 operatively couples and communicates between the control computing device 16 and the diamond cutting tool 12 as known in the art. In another example, the control computing device 16 is a highly integrated microcontroller device with a variety of on-board hardware functions, such as analog to digital converters, digital to analog converters, serial buses, general purpose I/O pins, RAM, and ROM.

Although the exemplary control computing device 16 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the control computing device 16.

Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary process for microchiseling a surface to form retroreflective microstructures, including polygonal projected aperture retroreflective prisms, thereon will be described with respect to FIGS. 1-10.

The microchiseling process is started by providing the substrate 14 as described above. In one example, a preprocessing step is included in the microchiseling process to prepare the substrate 14. The microchiseling process is a relatively slow process when compared to ruling and flycutting which produce long linear grooves quickly. To reduce the cycle time, the preprocessing step is included to allow excess material to be roughed out of the substrate 14 using designs for truncated prism geometry or grooves or other patterns prior to finishing the final prism geometry on the substrate 14 using the microchiseling process as described below. This roughing technique can greatly reduce the process time. In addition, a more robust diamond can be used to rough out large cut depths at faster machining speeds. Next, a finishing diamond can be used to obtain the final geometry in the microchiseling process as described below.

Figure 2:
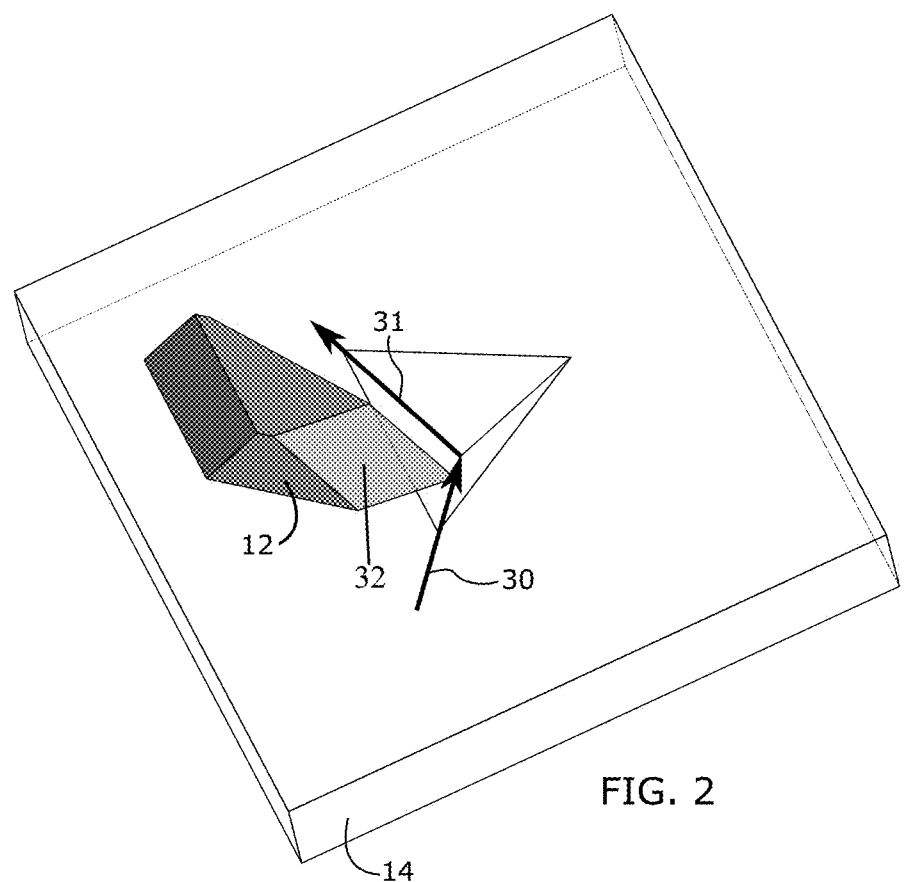
FIG. 2 is a representation of a typical insertion and retraction tool path for microchiseling a substrate with a diamond tool.

Next, in order to perform the microchiseling process, the diamond of the diamond cutting tool 12 is plunged and retracted through the substrate 14. An exemplary tool path of the diamond cutting tool 12 is illustrated in FIG. 2. The microchiseling process uses the translation machine 13 to plunge the diamond into the substrate 14 along an insertion path 30 and to retract the diamond from the substrate 14 along a retraction path 31. The plunging and retracting use the feed rate of the translation machine 13 to move the diamond cutting tool 12 through the substrate 14 and to move the diamond cutting tool 12 along one or more other axes of motion of the translation machine 13 to produce a facet of the given cube, although in other examples, the substrate 14 may be moved alone, or in conjunction with movement of the translation machine 14, to produce the facet. The facets will be at an angle defined by the orientation of a chiseling edge 32 of the diamond of the diamond cutting tool 12, as shown in FIG. 2. In this manner, the facets formed from the microchiseling will be parallel with the motion of the translation machine 13. If, however, additional axes are engaged on a more complex tool path, the formed facets can have step functions, radii, freeform profiles, or arbitrary shapes, by way of example only. In another example, facet topology can also be non-flat by using a specially contoured diamond cutting tool 12.

The plunging along the insertion path 30 and retracting along the retraction path 31, for example, are repeated at various locations along the substrate 14 to form a plurality of retroreflective structures on the substrate 14. In one example, the microchiseling is controlled by the control computing device 16 coupled to the translation machine 13. The microchiseling process allows for a number of retroreflector array designs, including general polygonal shapes, such as triangular, rhombic, rectangular, square, pentagonal, hexagonal, octagonal, or otherwise polygonal by way of example.

Various retroreflector geometric configurations, such as those disclosed in U.S. Pat. No. 6,015,214, the disclosure of which is incorporated herein by reference in its entirety, may be formed using the microchiseling process. The DMC method for forming retroreflective prisms disclosed herein is able to create these same geometric embodiments with much more flexibility and many other geometric embodiments not possible using the methodology disclosed in U.S. Pat. No. 6,015,214.

Figure 3:
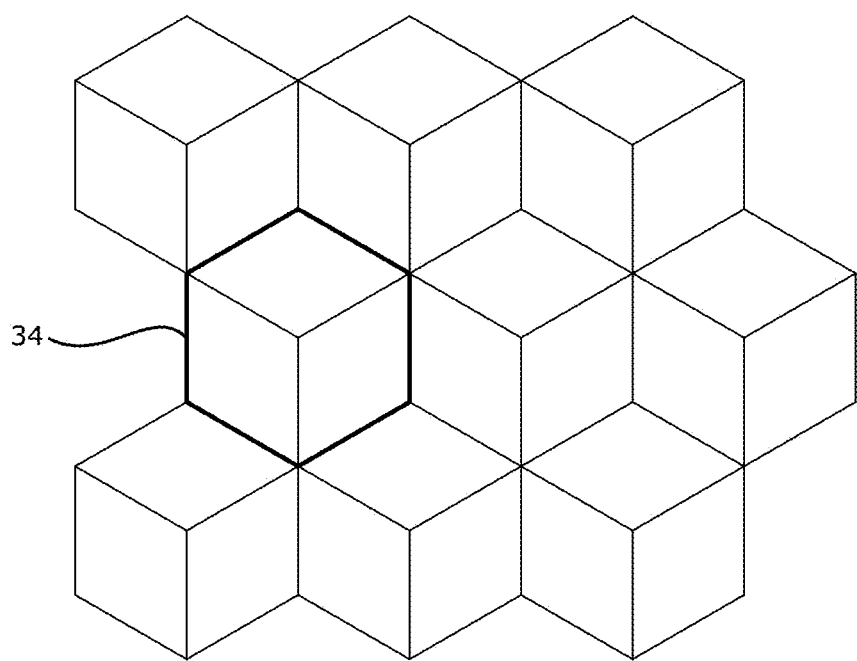
FIG. 3 is an exemplary Type I hexagonal retroreflector that may be formed using methods of this technology.
Figure 4:
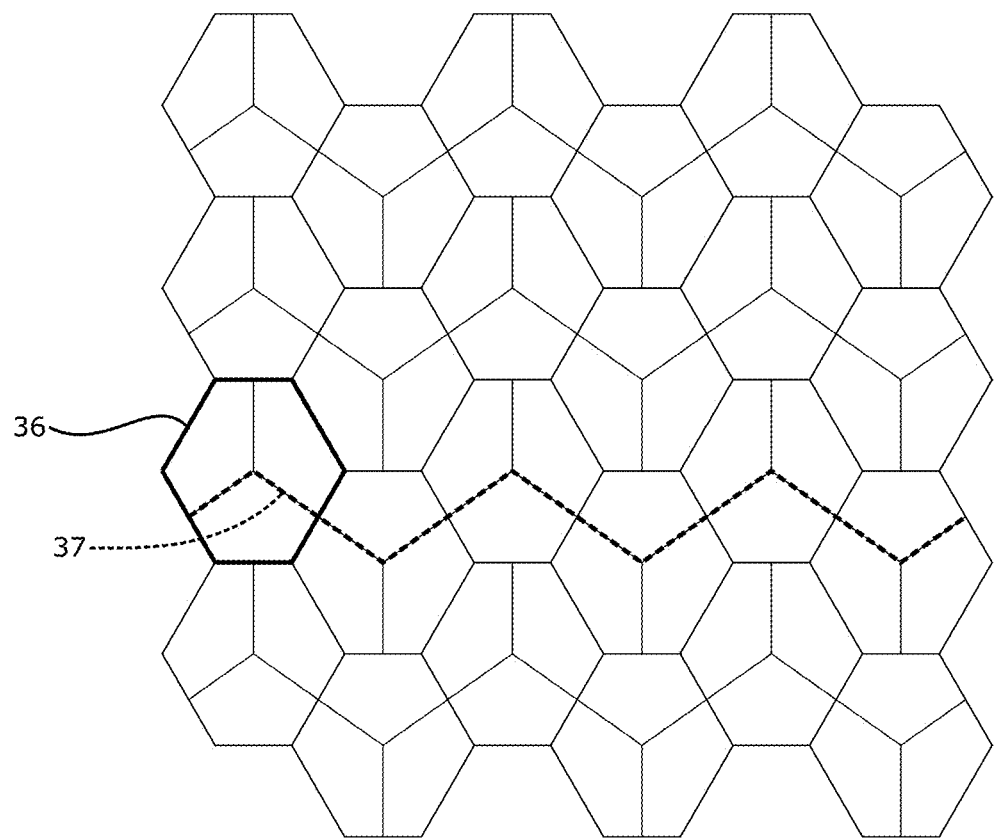
FIG. 4 is an exemplary Type II hexagonal retroreflector arranged with flow channels that may be formed using methods of this technology.

FIGS. 3 and 4 show exemplary hexagonal retroreflectors or prisms that may be formed in a substrate using the methods described herein. Hexagonal projected aperture prism retroreflectors can have two basic geometric types: Type I (FIG. 3) and Type II (FIG. 4). Referring to FIG. 3, Type I hexagonal prisms are defined as having geometry where the dihedral edges intersect the corners of an outer hexagonal projected aperture 34 such that the resulting prism facets are four sided. Referring to FIG. 4, in contrast, Type II hexagonal prisms are defined as the geometry where the prism's dihedral edges do not intersect the corners of the outer hexagonal projected aperture 36. Type II prisms result in three pentagonal facets. As shown in both FIG. 3 and FIG. 4, the dihedral edges are edges formed at the intersection of the facets of the prism and these dihedral edges meet at the apex of the hexagonal prism. There are three dihedral edges and three facets for the hexagonal prism design. For a given aperture size, Type I prisms are deeper or taller than Type II prisms of the same aperture size.

Figure 5:
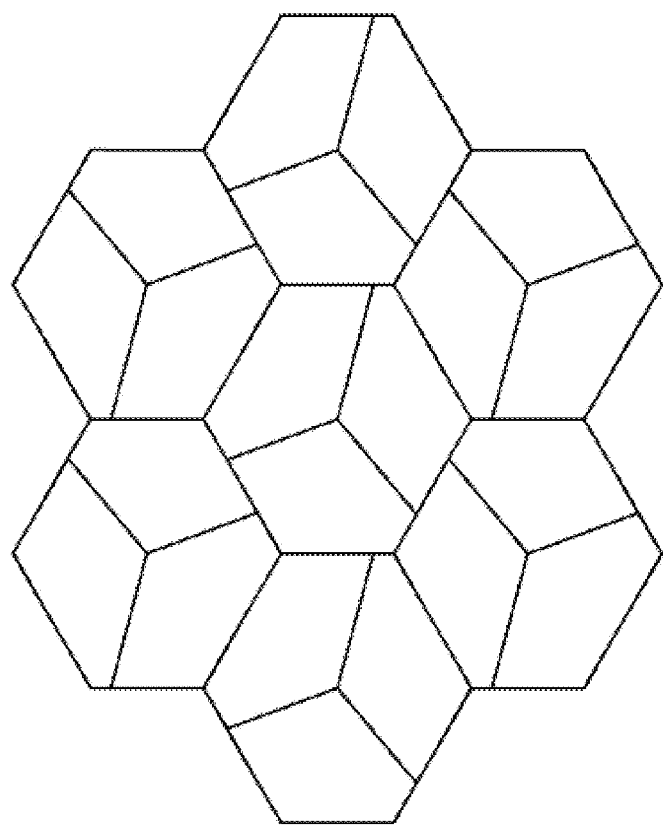
FIG. 5 shows an exemplary array of hexagonal retroreflective prisms having the same rotation formed using methods of this technology.

With respect to the design for the hexagonal projected aperture prisms, for the Type II hexagonal prisms as illustrated in FIG. 3, microchiseling allows for variable orientation of the prisms within a given aperture. The dihedral edges may have an arbitrary rotation within the hexagonal aperture. FIG. 5 shows an exemplary array of hexagonal retroreflective prisms formed using the methods of the present technology in which a constant rotation is applied to the prisms within the aperture throughout the array.

In another example, the microchiseling process also allows each prism in the array to have a different rotation of the dihedral edges within the aperture. In addition, a set group of rotations can be designed such that a given ratio of set rotations can be included in an array. In one example, 50 percent of the hexagonal prisms in the array are un-rotated, 25 percent are rotated at 10 degrees, and 25 percent are rotated at −10 degrees. Although an exemplary set of rotations is described, it is to be understood that the microchiseling process allows for any combination of rotation angles and variations of ratios of rotations within an array. In one example, as illustrated in FIG. 4, Type II hexagonal prisms can be arranged and manufactured with flow channels 37 that assist in the replication process as described further below.

Microchiseling allows for rotation of the facets and dihedral edges of a Type II hexagonal prism, as shown in FIG. 5, with the aperture remaining a fixed size. In one example, the aperture size of the hexagonal prisms can be varied in the array. Although prism rotation may create vertical wall artifacts where dihedral edges meet the aperture, these artifacts can be minimized or eliminated or designed to have a draft angle to facilitate replication processes as described in further detail below. In another example, the entire prism along with the aperture is rotated to an arbitrary angle in a given array. In this way, arbitrary geometric tiling arrangements are possible.

Figure 6:
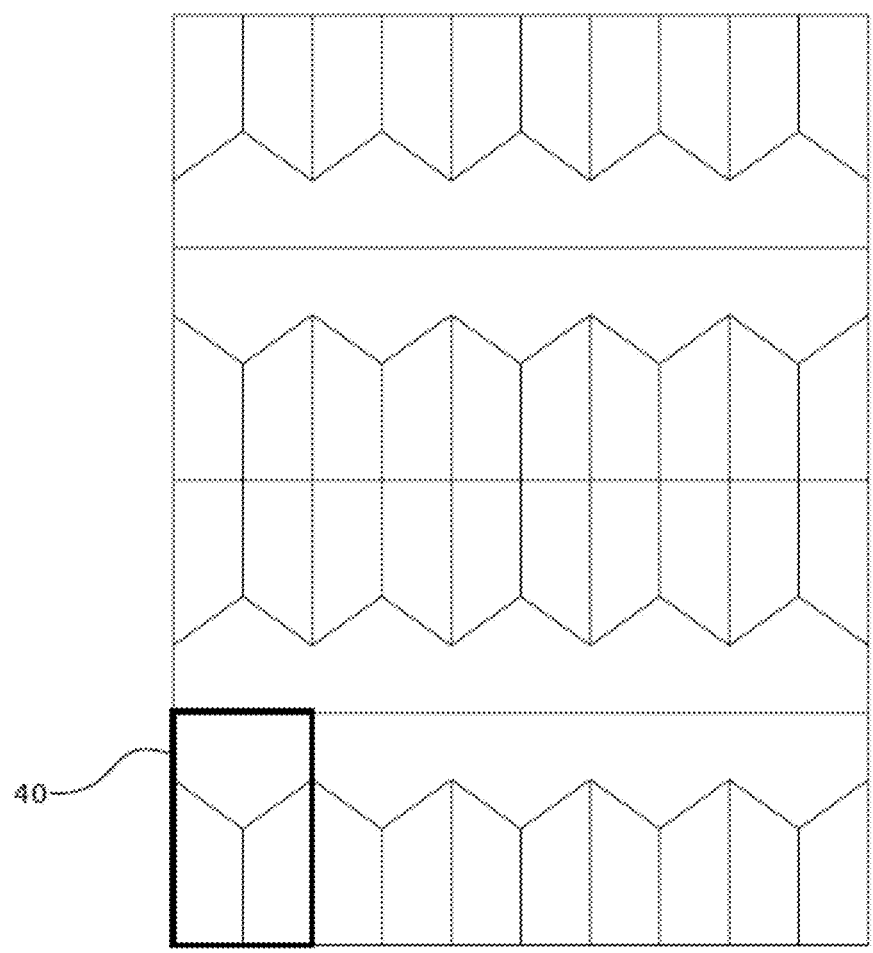
FIG. 6 shows an exemplary array of rectangular retroreflective prisms that may be formed using methods of the present technology
Figure 7:
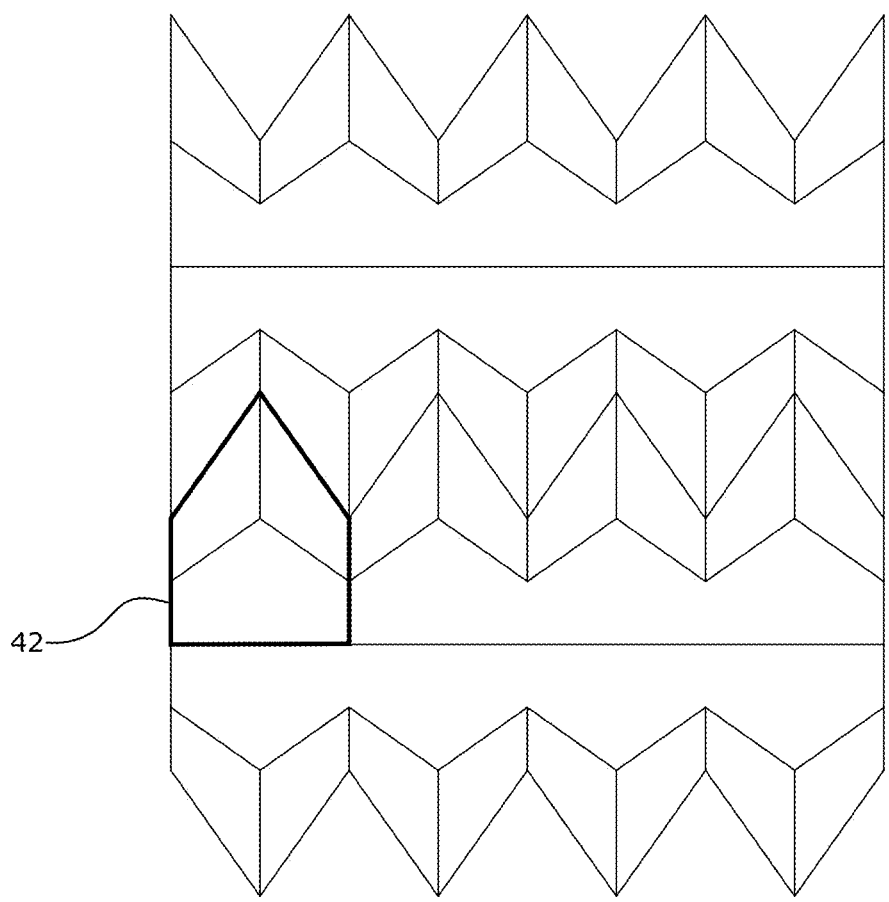
FIG. 7 shows an exemplary array of pentagonal retroreflective prisms that may be formed using methods of this technology.
Figure 8:
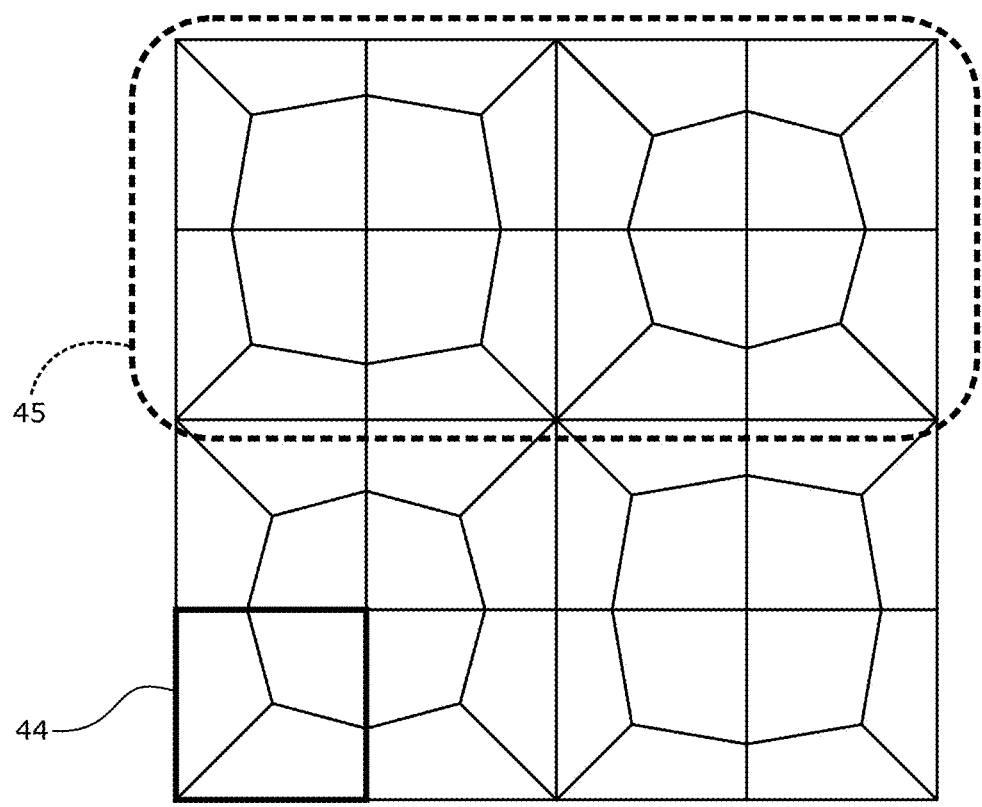
FIG. 8 shows an exemplary array of square retroreflective prisms arranged with varying tilt angles within the array that may be formed using methods of this technology.
Figure 9:
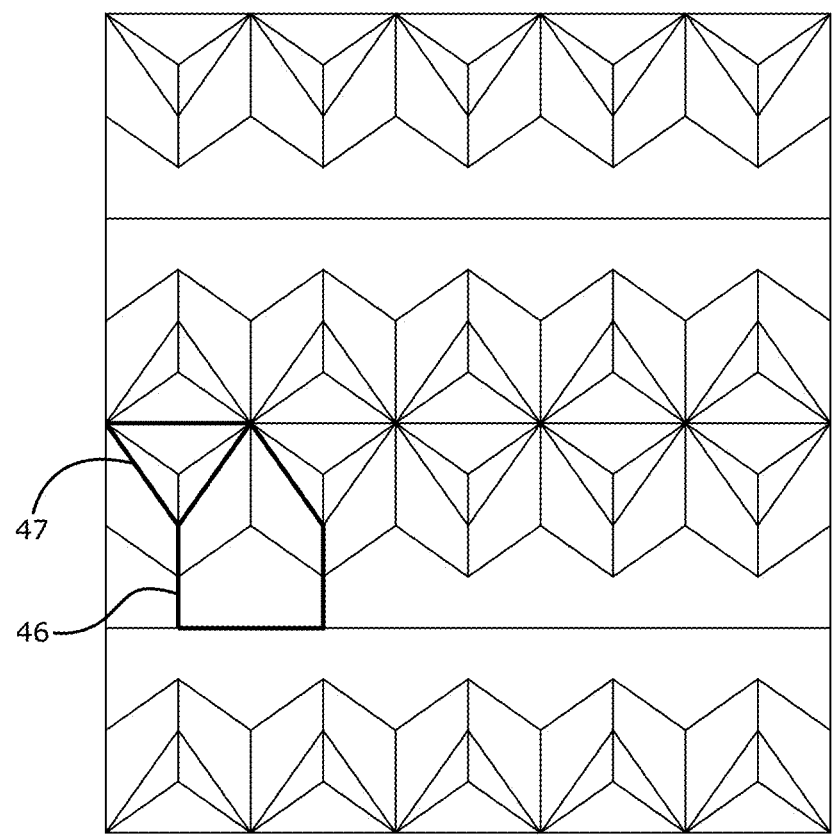
FIG. 9 shows an exemplary hybrid array of pentagonal and truncated triangular retroreflective prisms that may be formed using methods of this technology.
Figure 10:
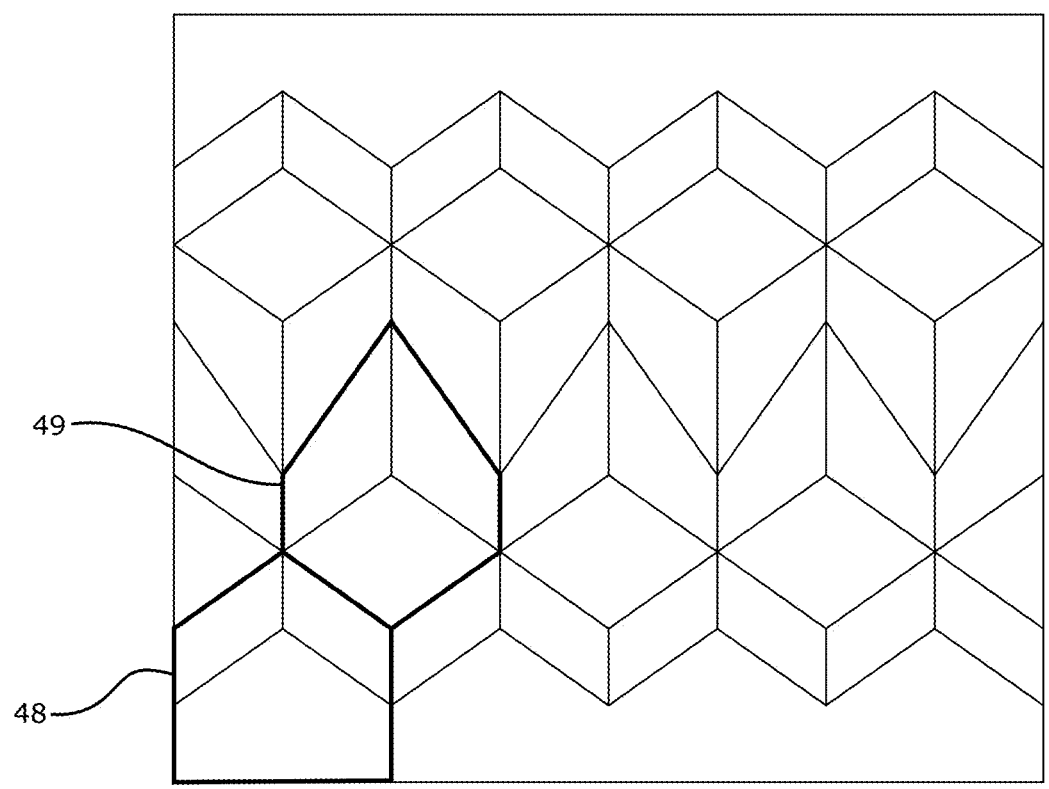
FIG. 10 shows an exemplary hybrid array of pentagonal and irregular hexagonal retroreflective prisms that may be formed using methods of this technology.

By way of example only, additional geometric embodiments of retroreflective prism arrays that may be formed using the methods disclosed herein are shown in FIGS. 6-10. FIG. 6 illustrates retroreflective prisms having a rectangular projected aperture 40. FIG. 7 illustrates retroreflective prisms having a pentagonal projected aperture 42. FIG. 8 illustrates retroreflective prisms having a square projected aperture 44. FIGS. 9-10 illustrates retroreflective arrays having hybrid combinations of differently shaped projected aperture retroreflective prisms.

The ability to design and manufacture prisms without tilt, with positive tilt, with negative tilt, and with a combination of these tilts is also feature of the microchiseling process. Retroreflector prism tilt can be utilized to enhance light return in the direction of such tilt as described in U.S. Pat. Nos. 4,588,258, 2,380,447, and 5,171,624, the disclosures of which are incorporated herein by reference in their entirety. For conventional prism design, the tilt of the prism would necessitate an aperture change. The microchiseling process allows the prism tilt and rotation to be incorporated into the design without altering the prism aperture. One such exemplary form is shown in FIG. 8 where the adjacent sets of four square aperture retroreflectors 45 have very different prism tilts as evidenced by the difference in facet area proportions.

Referring now to FIGS. 9-10, the microchiseling process has the ability to mix retroreflector prisms of any type and geometry. For instance, as shown in FIG. 9, truncated triangular projected aperture prisms 47 can be intermixed with pentagonal projected aperture prisms 46. Another example is shown in FIG. 10, wherein pentagonal projected aperture prisms 48 are mixed with irregular hexagonal projected aperture prisms 49. In addition, the design is unconstrained so that different pitches and sizes of the same type of prism may be mixed. Other combinations of variable pitch and variable depth of prisms are also possible. In addition to multiple types of prisms of the same design, the prism depths can be designed to be equal with variable prism apertures or the prism depths can be designed to vary according to the aperture of the specific prism geometry. Many design capabilities are available with the flexibility of microchiseling including: triangular, rhombic, rectangular, square, pentagonal, hexagonal, octagonal, or otherwise polygonal apertures with variable rotation, tilt, and multi-dihedral angle within each prism or groups of prisms. In addition, the spacing between the retroreflectors can be modified to create specific patterns, clusters of retroreflectors or other cosmetic features as desired. In addition, the spacing between the retroreflectors can be modified to create specific patterns, clusters of retrorefectors or other cosmetic features as desired.

Microchiseling further allows for random or variable aperture sizes to be chosen to reduce or eliminate diffraction effects. Randomizing, pseudo-randomizing, or selecting a discrete set of aperture sizes, allows the optical performance of the retroreflector array to converge toward a purely geometric model.

The microchiseling process may be utilized to adjust depths, pitches, angles, and surface finish of prism facets individually. These adjustments can be made for anti-counterfeiting features and can include, by way of example only, inserting hidden features on the generated facets at a microscopic scale; inserting visible logo features at a macro scale which can be several or many prisms in size, or the pattern of the retroreflector articles and their respective spacing to each other; generating features that are only visible at certain angles of viewing, specific wavelengths, illumination conditions, or using specialized measurement equipment at non-visible wavelengths. A method of achieving surface finish differences involves tailoring the forces and feed rate for specific facets or specific prisms in an array.

In another example, utilizing microchiseling, logos can be designed into the prism pattern to be non-destructive and functional compared to current engraving patterns which reduce photometric performance. For example, the cutting program may be modified in a prescribed way to generate a "watermark" type effect. For multi-DAD/tilt designs, specific prism prescriptions can be aggregated together for the watermark pattern. In this example, similar prism prescriptions are arranged into watermark defining regions.

The microchiseling process allows for the incorporation of draft angle cuts into structure walls to aid in release during electroforming or molding. In cases of certain geometries, the prism structures generated in the substrate would have vertical walls or undercuts which would be difficult to release in further replication processes. Some retroreflector designs have facets of prisms that overlap with the facets of abutting prisms. These overlaps will result in draft angles that are negative and will cause the structures to "lock on" during subsequent replication into tooling. Microchiseling allows the incorporation of machining features that can eliminate these undercuts, or interference surfaces, and replace them with a vertical wall (no undercut) or allow for a positive angle (draft) on these surfaces to facilitate easier release in replication.

High tension forces on the diamond tool may reduce tool longevity. In one example, the microchiseling is controlled to avoid high tension forces on the diamond cutting tool 12 during the retraction portion of the cut. In this example, the operation of the diamond cutting tool 12 is optimized to effect material removal during plunges, where the diamond is more robust to the compression forces generated, instead of tool retractions. This process of only machining with the diamond in compression is a method to increase the diamond lifetime as removing material during retraction results in an increased chance of causing tool damage as the diamond is put in tension.

Once a prism array has been completed in the substrate using the microchiseling process, the substrate may be replicated into a roll-to-roll belt or cylindrical belt used to make polymer retroreflective film sheeting. To reduce the cycle time for replication, injection molded replicas can be made and parqueted together to form larger sized tooling. The microchiseling process results in a relatively small master (2 inch square size) due to the time required to chisel each cube as well as the limits of the travel on the machine tool where the masters are produced. Replication and parqueting is required to get the mastered structure into a size to be able to run roll-to-roll polymer processing.

The prism array may be replicated and parqueted, by way of example, on a cylindrical belt from 24 to over 50 inches wide and having a circumference from 25 to 150 inches as described in U.S. Pat. Nos. 4,478,769 and 6,322,652, as well as PCT Pub. No. WO 2103/151691, the disclosures of which are incorporated herein by reference in their entirety. For the structure to fully cover the outside surface of the manufacturing drum, the tool master must be replicated and parqueted.

In one example, multiple polymer replicas of the microchiseled part are made and are accurately parqueted together to make the larger array of retroreflective prisms for the belt. This larger array can then be coated with a conductive coating and replicated in an electroforming process to produce individual stampers that can then be assembled into a belt. The polymer replication parquet process is less expensive, takes less time to produce, and maintains the required optical performance of the final UV cast or embossed retroreflectors.

The use of the polymer replicas allows for portions of the retroreflective array to be rearranged during the parquet process. Since the process of making the belt requires parqueting of the master, the replicas of the microchiseled retroreflectors can be oriented to enhance retroreflective performance at the angles required by the end product which varies by application.

With the microchiseling process, either a positive or negative generation part can be designed and machined based on the prism geometry, design constraints, and cutting logistics. Due to the adaptability of the microchiseling process, either the positive or negative generation of the part can be manufactured. Reasons for choosing one orientation over another include geometry of the prism that may preclude one generation or the other due to interference during the machining process and prisms with angles that would require very small included angle diamonds on one generation or the other. A special prism array may be designed to be generation agnostic regardless of replication generation. For example, seamless integration of "positive" and "negative" generation cube corners may be possible. This has the side effect of reducing the active area by the fraction of prisms at the "wrong" generation in the finished part but may be beneficial for dual sided retroreflective products. Additionally, since both positive and negative tool generations may both be used, the yield of available tools for the manufacturing process may be effectively doubled.

Truncated prism retroreflective designs have each prism bordered by three non-dihedral edges in a single plane. This design reduces the casting or embossing speeds due to forming a closed cell that must be filled with polymer and the trapped air either released or allowed to diffuse through the materials. A prism array without closed cell pockets and incorporating channels for the polymer material or the air to flow permits the venting of gasses and flow of polymer material during fabrication. In one example, the Type II hexagonal prisms can be arranged and manufactured with flow channels as shown in FIG. 4 to provide flow continuity for the replication process. Flow continuity is instrumental in the molding or casting process as the material is not trapped in a closed cell. This flow line can be oriented in the casting or molding direction on the manufacturing belt to ease material flow and speed processing.

Accordingly, this technology advantageously provides enhanced methods for forming retroreflective prisms in a substrate that may be used for making retroreflective sheeting and tooling having polygonal retroreflectors using microchiseling techniques. Additionally, the techniques advantageously provide for generation of cube corner prisms and enhance design capabilities for retroreflective arrays.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for forming a retroreflective prism in a substrate, the method comprising:
   inserting a single point diamond tool through a surface of the substrate along an insertion path while moving the single point diamond tool, the substrate, or both the single point diamond tool and the substrate in a direction of travel along at least one axis;
   retracting the single point diamond tool from the surface of the substrate along a retraction path while moving the single point diamond tool, the substrate, or both the single point diamond tool and the substrate in the direction of travel along the at least one axis to generate a facet in the substrate having a facet face parallel to the direction of travel of at least one of the single diamond point tool or the substrate, wherein the insertion path and the retraction path are along different axes, wherein the facet face has an angle defined by a chiseling edge of the single point diamond tool; and
   forming an array of retroreflective microstructures on the surface of the substrate by repeating the inserting and retracting at a plurality of locations on the substrate, wherein at least one of the retroreflective microstructures in the array of retroreflective microstructures is a retroreflective prism having a polygonal projected aperture.

2. The method of claim 1, wherein the forming the array of retroreflective microstructures on the surface of the substrate further comprises:
   selecting the plurality of locations for the repeating the inserting and retracting to generate at least one of triangular, rhombic, rectangular, square, pentagonal, hexagonal, or octagonal projected aperture retroreflective prisms.

3. The method of claim 1, wherein the forming the array of retroreflective microstructures on the surface of the substrate further comprises:
   selecting the plurality of locations for the repeating the inserting and retracting to generate multiple types of retroreflective prisms.

4. The method of claim 1, wherein the forming the array of retroreflective microstructures on the surface of the substrate further comprises:
   selecting the plurality of locations for the repeating the inserting and retracting to generate individual retroreflective prisms with variations in tilt, rotation, facet angle, height, and size.

5. The method of claim 1, wherein the inserting or retracting further comprises:
   inserting and retracting the single point diamond tool through the surface of the substrate while moving the single point diamond tool or the substrate in multiple directions of travel to generate the facet in the substrate having a facet face including a step function, a radius, a freeform profile, or combinations thereof.

6. The method of claim 1 further comprising:
inserting and retracting the single point diamond tool through the surface to generate one or more draft angles in the array of retroreflective microstructures.

7. The method of claim 1 further comprising:
adjusting the inserting and retracting of the single point diamond tool to adjust a depth, pitch, or surface finish of the generated facet.

8. The method of claim 1, wherein the substrate is non-plano.

9. The method of claim 1 further comprising:
replicating the array of retroreflective microstructures to form a retroreflector tool comprising the array of retroreflective microstructures.

10. The method of claim 9 further comprising:
repeating the replicating to form a plurality of retroflector tools comprising the array of retroreflective microstructures;
parqueting the plurality of replica retroreflector tools; and
applying the parqueted plurality of replica retroreflector tools to a cylindrical drum, cylindrical belt, or roll to roll belt.

11. The method of claim 10 further comprising:
forming a retroreflective sheet containing the array of retroreflective microstructures on a surface thereof using the cylindrical drum, the cylindrical belt, or the roll to roll belt.

12. The method of claim 1, wherein the inserting or retracting further comprises:
inserting and retracting the single point diamond tool through the surface of the substrate while moving the single point diamond tool or the substrate in multiple directions of travel to generate the facet in the substrate having a facet face including a step function, a radius, a freeform profile, or combinations thereof.

13. A method for forming a retroreflector tool, the method comprising:
inserting and retracting a single point diamond tool through a surface of the substrate while moving the single point diamond tool, the substrate, or both the single point diamond tool and the substrate in a direction of travel along at least one axis to generate a facet in the substrate having a facet face parallel to the direction of travel of at least one of the single diamond point tool or the substrate, wherein the facet face has an angle defined by a chiseling edge of the single point diamond tool;
forming an array of retroreflective microstructures on the surface of the substrate by repeating the inserting and retracting at a plurality of locations on the substrate, wherein at least one of the retroreflective microstructures in the array of retroreflective microstructures is a retroreflective prism having a polygonal projected aperture;
replicating the array of retroreflective microstructures to form a plurality of retroreflector tool comprising the array of retroreflective microstructures;
parqueting the plurality of replica retroreflector tools; and
applying the parqueted plurality of replica retroreflector tools to a cylindrical drum, cylindrical belt, or roll to roll belt.

14. The method of claim 13, wherein the forming the array of retroreflective microstructures on the surface of the substrate further comprises:
selecting the plurality of locations for the repeating the inserting and retracting to generate at least one of triangular, rhombic, rectangular, square, pentagonal, hexagonal, or octagonal projected aperture retroreflective prisms.

15. The method of claim 13, wherein the forming the array of retroreflective microstructures on the surface of the substrate further comprises:
selecting the plurality of locations for the repeating the inserting and retracting to generate multiple types of retroreflective prisms.

16. The method of claim 13, wherein the forming the array of retroreflective microstructures on the surface of the substrate further comprises:
selecting the plurality of locations for the repeating the inserting and retracting to generate individual retroreflective prisms with variations in tilt, rotation, facet angle, height, and size.

17. The method of claim 13 further comprising:
inserting and retracting the single point diamond tool through the surface to generate one or more draft angles in the array of retroreflective microstructures.

18. The method of claim 13 further comprising:
adjusting the inserting and retracting of the single point diamond tool to adjust a depth, pitch, or surface finish of the generated facet.

19. The method of claim 13, wherein the substrate is non-plano.

20. The method of claim 13 further comprising:
forming a retroreflective sheet containing the array of retroreflective microstructures on a surface thereof using the cylindrical drum, the cylindrical belt, or the roll to roll belt.

* * * * *